May 21, 1968 J. C. FLYNN 3,383,934
VARIABLE SPEED DRIVE MECHANISM
Filed July 1, 1966 2 Sheets-Sheet 2

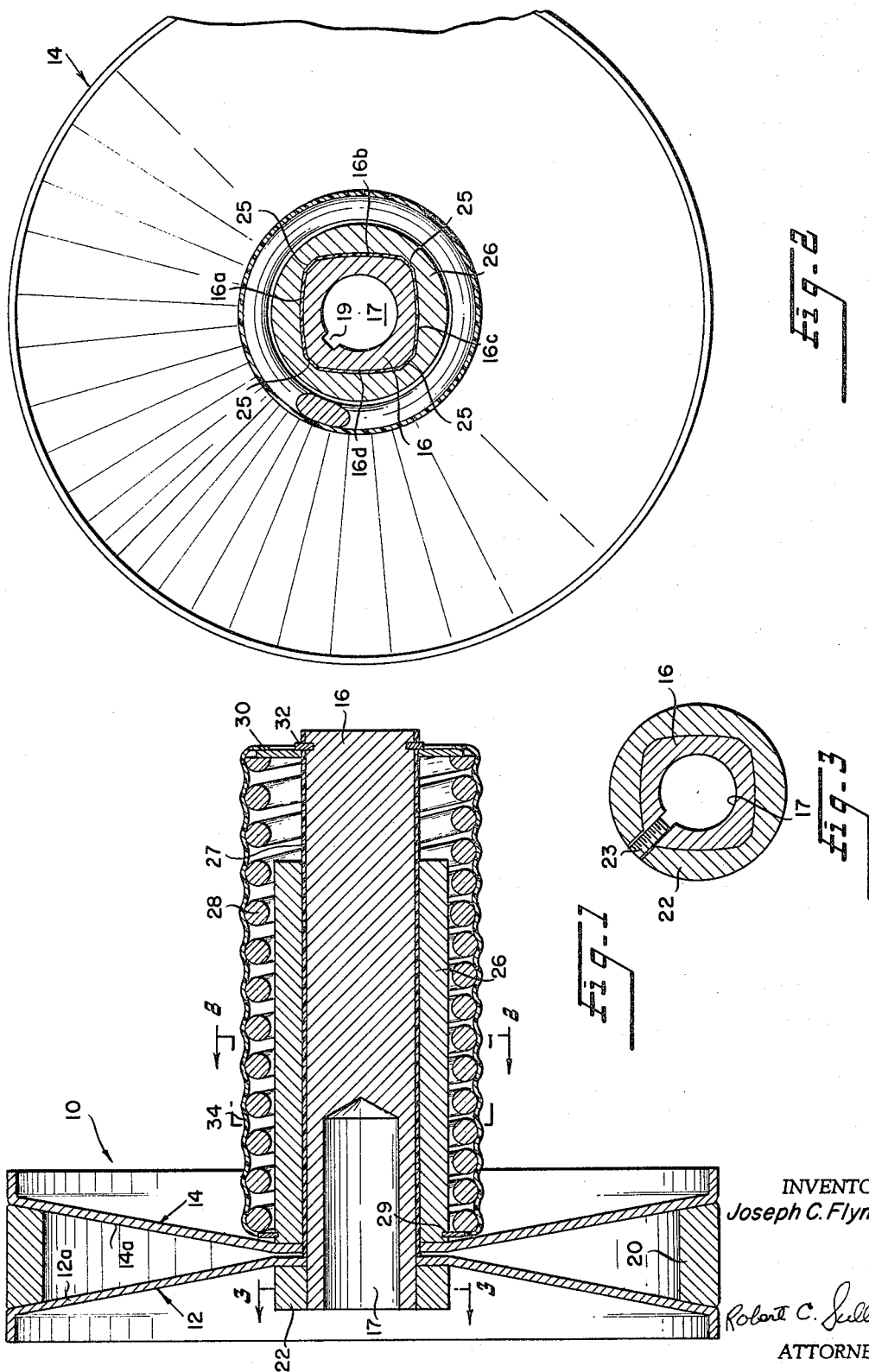

INVENTOR
Joseph C. Flynn

BY Robert C. Sullivan

ATTORNEY

United States Patent Office 3,383,934
Patented May 21, 1968

3,383,934
VARIABLE SPEED DRIVE MECHANISM
Joseph C. Flynn, Bridgeton, N.J., assignor to General Mold and Machinery Corporation, Millville, N.J., a corporation of New Jersey
Filed July 1, 1966, Ser. No. 562,177
7 Claims. (Cl. 74—230.17)

ABSTRACT OF THE DISCLOSURE

This specification discloses a pulley having a variable effective diameter and which consists essentially of: a pair of complemental conical metal stamped discs, a short hub secured to one disc, a sleeve of polygonal cross section affixed to said hub against axial and rotative movement relative thereto; an elongate hub extending outwardly from the other disc to which it is secured and having a passage of polygonal cross section corresponding to that of the sleeve which is slidably received therein; a spring biasing said discs together, and a cover for the spring.

---

This invention relates to variable pitch pulleys for use with variable speed drive mechanisms, and more particularly to a slidable mounting arrangement for variable pitch pulleys or sheaves of the type having a pair of tapered or coned discs which are axially movable relative to each other to change the effective diameter of the pulley and thus to change the speed ratio of the pulley relative to another pulley with which it is in belted relation, and to methods of making such variable pitch pulleys.

In the practical operation of the devices of the prior art, difficulty has been experienced due to the fact that the keyed or splined connection conventionally provided between the axially movable hubbed disc and the shaft frequently results in a roughening or "fretting" of the contiguous metal surfaces of the hub of the slidable disc and the metal shaft on which the slidable disc is keyed or splined. This fretting or roughening of the bearing surfaces between the slidable disc hub and the shaft causes a frictional engagement between the shaft and the slidable disc hub which often makes it extremely difficult or impossible to axially move the disc to provide a required change in the effective diameter of the pulley if the slidable pulley disc is left in the same position for any appreciable length of time. Because of this fretting problem, it is frequently the practice to periodically shift the slidable disc to avoid such fretting.

Other undesirable characteristics of prior art keyed or splined mounting arrangements for the axially movable disc or discs of variable pitch pulleys is the fact that this type of connection makes it difficult to maintain concentricity between the pulley and the shaft on which it is mounted, permitting the pulley to become unbalanced, which further contributes to the fretting problem previously discussed. Also, the difficulty in maintaining a close dimensional fit between the slidably movable disc and the shaft to which it is keyed or splined in accordance with the prior art is a factor which causes undesirable backlash between these members.

It has been known in the prior art to provide variable pitch pulley members in which the movable pulley disc includes a hub member of polygonal cross section slidably movable along a sleeve member of corresponding polygonal cross section, as shown, for example, by United States Patents 3,010,333—Rampe, and 3,114,271—Davis. However, the polygonal cross section sleeve members shown by the prior art as exemplified by the Rampe and Davis patents if extruded provide an inherent looseness of fit which is functionally unsatisfactory; whereas, if the flat edges or surfaces of the polygonal cross sectioned sleeve members of the Rampe and Davis patents are to have sufficiently close dimensional tolerances, then these surfaces must be individually machined, which is an economically impractical expedient.

It is an object of this invention to provide an improved construction and method of constructing variable pitch pulleys, and particularly pulleys of the type having a polygonal hub axially movable along a polygonal sleeve, which permits such pulleys to be manufactured economically at a minimum cost.

It is another object of the invention to provide an improved and more economical method of constructing the hub members for the pulley discs of a variable pitch pulley, and of assembling the hub members to the pulley discs.

It is another object of the invention to provide an improved method of constructing the sleeve member on which the hub members of the discs of a variable pitch pulley are mounted.

It is another object of the invention to provide an improved construction for variable pitch pulleys which permits closer manufacturing tolerances than in constructions of the prior art, and which provides a highly accurate sliding fit of the relatively slidable members of the pulley.

It is still another object of the invention to provide a mounting arrangement for a slidable disc or discs of a variable diameter pulley which provides a greater bearing surface for a given size assembly of pulley and shaft than other types of mounting arrangements for these members, and hence provides a greater torque transmission for a given size pulley and shaft assembly.

It is a further object of the invention to provide a variable speed pulley construction in which no lubrication is required for the relatively slidable surfaces of the pulley.

It is a still further object of the invention to provide a variable speed pulley construction in which the problem of "fretting" encountered in the keyed and splined connections of the prior art is eliminated, and in which the necessity for periodical shifting of the pulley to avoid such fretting is thereby eliminated.

In achievement of these objectives, there is provided in accordance with an embodiment of this invention a variable speed pulley device including a pair of pulley discs, at least one of which is axially movable relative to the other. The pulley discs are provided with extruded hub members each respectively having a polygonal passage therethrough which engages the external polygonal surface of a sleeve member mounted on the shaft. The pulley discs are welded at the radially inner portion thereof to the respective extruded hub members to provide an economical assembly of the pulley discs to their respective hub members. The sleeve member along which one of the pulley discs is slidably movable is extruded substantially to its final shape and to substantially its proper external polygonal dimensions and is then ground to its exact external dimensions by a polygon grinding operation. The extrusion forming the hub members is extruded to substantially its final shape to include a polygonal passage of substantially but not exactly the required internal dimensions and is then cut into lengths corresponding to the lengths of the respective hub members. The hub members are then calibration broached to the final exact internal dimensions required for the respective hub members. The exterior surface of the sleeve member is coated with polytetrafluoroethylene, sold under the registered trademark "Teflon" by E. I. du Pont de Nemours and Company, this coating being applied in the region engaged by the hub of the slidably movable disc member to eliminate the necessity for lubrication of the slidably movable surfaces.

Further objects and advantages of the invention will become apparent from the following description taken in conjunction with the accompanying drawings in which:

FIG. 1 is a view in longitudinal section of a variable speed pulley in accordance with the invention;

FIG. 2 is a view in transverse section taken along line 2—2 of FIG. 1 of the pulley of FIG. 1;

FIG. 3 is a view in transverse section taken along line 3—3 of FIG. 1;

Figure 4:
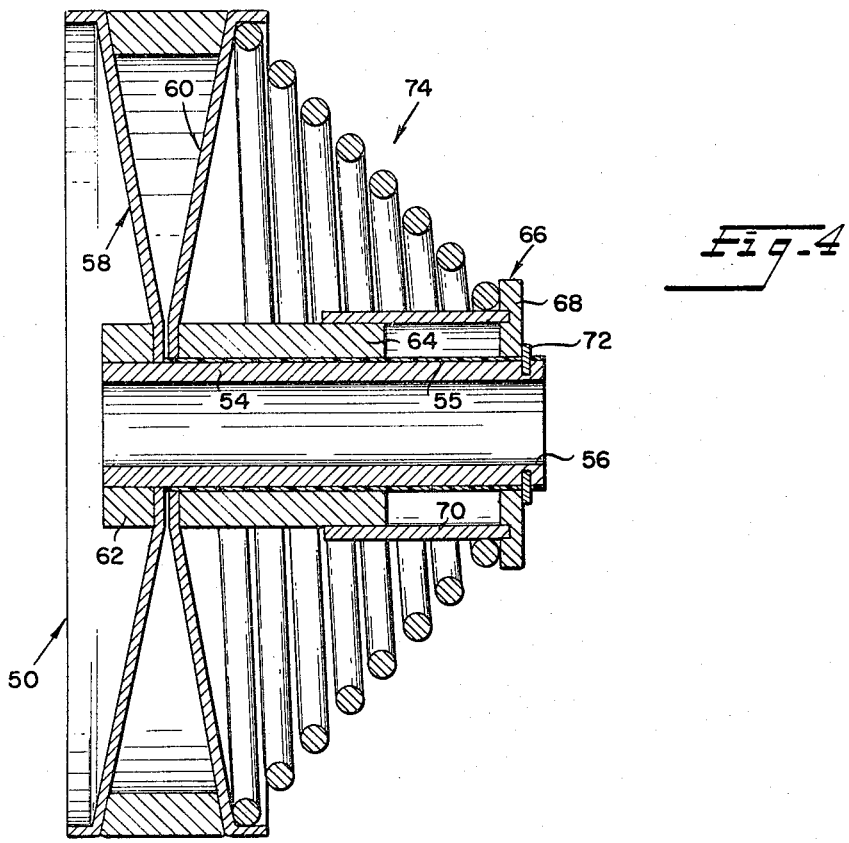
FIG. 4 is a view in longitudinal section of a pulley using a modified type of spring construction.

Referring now to the drawings, there is shown a variable pitch pulley generally indicated at 10 comprising first and second pulley discs 12 and 14, respectively, which are mounted on a sleeve 16 which, in turn, is keyed to a shaft which may be either the drive or driven shaft. Sleeve 16 is bored for only part of its length to receive the shaft. The discs 12 and 14 are provided with facing frusto-conical or tapered surfaces 12A and 14A, respectively, which receive a V-belt 20 which is movable radially to vary the effective diameter of the pulley, as is well known in the art. In the view of FIG. 1, the belt 20 is shown in its radially outermost position, in which the pulley 10 is at its maximum effective diameter. Any suitable means may be used for varying the position of belt 20 to vary the effective diameter of the pulley, such means forming no part of this invention. For example, the opposite ends of the belt may be trained around a constant diameter pulley, the axis of which may be moved with respect to the axis of the variable pitch pulley 10 as shown, for example, in United States Patent No. 2,107,483, issued to A. B. Knight on Feb. 8, 1938, or in United States Patent No. 3,064,486, issued to D. C. Aplin on Nov. 20, 1962. The pulley discs 12 and 14 are preferably stamped from high thermal conductivity metal such as aluminum which may be, for example, .090 inch thick. Such high thermal conductivity metal stampings transfer heat rapidly away from the pulley discs to thereby permit the belt to run cooler.

In the illustrated embodiment, pulley disc 12 is mounted for rotation with sleeve 16 but is not slidable thereon, whereas pulley disc 14 is rotatable with sleeve 16 and is also axially slidable thereon to thereby provide relative axial movement between discs 12 and 14.

In accordance with an important feature of the construction, as best seen in FIG. 2, the exterior surface of sleeve member 16 is formed of polygonal or non-circular transverse cross section and the inner surfaces of short hub 22 and elongated hub 26 are also of polygonal contour corresponding to the polygonal contour of the exterior surface of sleeve member 16. Each of the pulley discs 12 and 14 is provided with an opening therethrough at the radially inner portion thereof which corresponds to the polygonal external contour of sleeve 16. The interior polygonal surface of each respective hub member 22 and 26 and the polygonal exterior surface of the sleeve member 16 prevent any relative rotation between the hub members and the sleeve member, but permit sliding movement of the pulley disc 14 and its associated hub 26 along the polygonal exterior surface of the sleeve member.

Thus, the sleeve member 16 in the embodiment of FIGS. 1 and 2 is provided with four sides 16a, 16b, 16c and 16d, respectively, each of which has a slight convex curvilinear contour along the length of each respective side, whereby the exterior surface of the sleeve might be described as being of "curvilinear polygonal-shape." The sides 16a, 16b, 16c and 16d of the polygonal-shaped sleeve 16 are connected by rounded corners indicated at 25. The polygonal contour of the external surface of the sleeve member 16 is obtained in a grinding operation provided by a polygon grinding machine of the type manufactured by Fortuna-Werke Spezialmaschinenfabrik AG, Stuttgart-Bad Cannstatt, Germany. The sleeve member 16 is formed from an extrusion of aluminum, stainless steel or the like which is extruded with an external polygonal contour substantially the same as the final shape of sleeve 16, including the curvilinear sides and rounded corners, and having substantially but not exactly the required polygonal external dimensions. The external polygonal contour as extruded is then ground on the polygon grinding machine, to the exact curvilinear polygonal dimensions required subject to allowable tolerances. The extrusion from which sleeve 16 is formed is provided with a longitudinal bore 17 to receive the shaft and the keyway 19 is machined in communication with bore 17. The outer surface of the sleeve 16 is coated with polytetrafluoroethylene, sold by E. I. du Pont de Nemours and Company under the registered trademark "Teflon," as indicated at 27, to eliminate the necessity for lubrication of the relatively sliding surfaces of the hub 26 and sleeve 16. A plastic coating of some other material having self-lubricating or low friction sliding characteristics, such as nylon, may be used instead of Teflon to eliminate the necessity for lubrication of the relatively sliding surfaces of the hub and sleeve. The Teflon or nylon coating may be applied to the inner surface of the sliding hub instead of, or in addition to, being applied to the outer surface of the sleeve.

The polygon grinding machine used to grind the external polygonal surface of sleeve 16 includes a grinding wheel which has an eccentric movement imparted thereto as it rotates in contact with the rotating workpiece. By proper selection of the degree of eccentricity of the grinding wheel, together with a proper selection of the speed ratio of the rotation of the grinding wheel to the rotation of the workpiece, the kinematic shape of any profile being ground can be determined in advance, and the particular polygonal profile provided on the exterior surface of the sleeve 16 is a result of a particular selection of eccentricity of the grinding wheel and of the speed ratio of the rotating grinding wheel relative to the rotating workpiece. This is set forth in the publication entitled "Polygon Assemblies" by Fortuna-Werge Spezialmaschinenfabrik AG, Stuttgart-Bad, Cannstatt, Germany.

Figure 5:
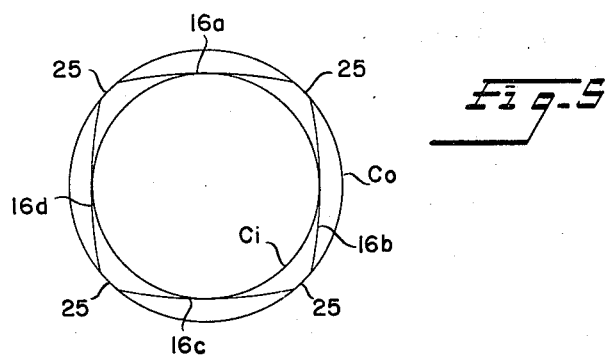
FIG. 5 is a diagrammatic view showing details of the external polygonal shape of the sleeve member.

There is shown in FIG. 5 a graphical construction which shows the curvilinear characteristics of the external polygonal surface of the sleeve member 16. A circle $C_i$ is inscribed within the boundaries of the four sides 16a, 16b, 16c and 16d while a circle $C_o$ circumscribes the rounded corners 25 of the polygonal surface of the sleeve member.

The radially inner portion of pulley disc 12 is welded to the axially inner end of short hub 22. Hub 22 has a clearance passage therethrough to receive a set screw 23 which also passes through a threaded passage in sleeve 16 and clamps against a key received in cooperating keyways provided in sleeve member 16 and in the shaft received by the sleeve member. The axially movable pulley disc 14 is welded at the radially inner end thereof to the axially inner end of elongated hub 26. The short hub 22 of disc 12 and the elongated hub 26 of disc 14 may both originally be part of a single extrusion of aluminum, stainless steel, or other suitable extrudable metal, but are cut into two separate sections from the initial extrusion to form the separate hubs 22 and 26. While hubs 22 and 26 are preferably cut from the same extrusion, obviously they could be formed from separate extrusions.

The extrusion from which the pulley disc hubs 22 and 26 are formed is extruded to include a passage of curvilinear polygonal cross section therethrough having substantially but not exactly the proper internal dimension to permit hubs 22 and 26 to engage the curvilinear polygonal outer surface of sleeve member 16. The hub forming extrusion is cut into lengths corresponding to the axial lengths of the respective hubs 22 and 26 and the respective hubs are calibration broached to the proper internal curvilinear polygonal dimensions required for the respective hubs to properly engage the curvilinear polygonal outer surface of sleeve member 16. The internal dimension to which hub 22 is broached differs slightly from the dimension to which hub 26 is broached due to the following factors:

(1) Hub 22 is shrunk fit onto the external surface of sleeve 16;
(2) The "Teflon" coating to be hereinafter described is not applied to sleeve 16 in the region where hub 22 is attached.

Both of the factors 1 and 2 just enumerated require that hub 22 be broached to a slightly smaller internal dimension than hub 26.

The axially movable pulley disc 14 is constantly biased toward the fixed pulley disc 12 by means of a helical spring 28 which surrounds the elongated hub 26 of pulley disc 14. One end of spring 28 bears against a washer 29 which in turn bears against the radially inner portion of disc 14, while the opposite end of spring 28 is confined by washer 30. The washer 30 is retained in position by a metal snap ring 32 which is received in a groove in the outer surface of sleeve 16. The outer surface of spring 28 is covered with a shrinkable plastic cover 34 of a plastic material such as a polyolefin which serves as a dustproof cover for the spring. The opposite axial ends of the plastic cover 34 are turned radially inwardly about the edges of the respective washers 29 and 30.

There is shown in FIG. 4 a modified construction of the variable speed device generally indicated at 50 which differs from the device of the embodiment of FIGS. 1–3 principally in the fact that a conical spring is used in place of the helical spring of the embodiment of FIGS. 1–3. The device 50 includes an inner or male sleeve 54 which is bored throughout its length to receive a shaft to which the device 50 is keyed. The external surface of the sleeve member 54 is provided with a polygonal contour similar to that provided on the sleeve member 16 of the embodiment of FIGS. 1 and 2. The portion of the external polygonal surface of sleeve member 54 which serves as a bearing for the slidably movable hubbed disc 60 is coated with Teflon to provide self-lubrication of this surface, as indicated at 55. A pair of pulley disc members generally indicated at 58 and 60, respectively, are mounted on the member 54. Pulley disc members 58 and 60 are preferably formed from aluminum stampings which are hard anodized on the facing belt-engaging surfaces thereof. The pulley disc 58 is welded at its radially inner portion to the short hub 62, while the pulley disc 60 is welded at the radially inner portion thereof to the hub 64. The hubs 62 and 64 are constructed similarly to the hubs 22 and 26 described in connection with the embodiments of FIGS. 1 and 2, having a polygonal internal contour, and being formed of extrusions of aluminum or other suitable metal which are extruded to substantially the required dimensions and are then calibration broached to the exact curvilinear polygonal internal dimensions required. Hub 62 of pulley disc 58 is shrunk fit onto the external surface of sleeve 54 as in the embodiment of FIGS. 1–3. Pulley disc 58 and its associated hub 62 are rotatable with sleeve 54 and the shaft but are not slidable thereon, whereas disc 60 and its hub 64 are rotatable with and slidably movable along sleeve 54. A set screw, not shown in the view of FIG. 4, passes through a clearance passage in hub 62 and through a threaded passage in sleeve 54 and clamps against the radially outer surface of a key received in cooperating keyways in the sleeve 54 and in the shaft received by sleeve 54. A spring retainer member generally indicated at 66 is mounted on the male member 54. The spring retainer member includes a radially extending end member 68 which is grooved to receive the end of an axially-extending bushing-like member 70. The radially inner surface of member 70 is in sliding engagement with the outer surface of hub 64, as disc 60 and hub 64 move to effect changes in the effective diameter of the pulley. A snap ring 72 holds the spring retainer 66 in place. A conical spring generally indicated at 74 bears at one end against the radially outer portion of the pulley disc 60, while the opposite end of the spring 74 bears against the spring retainer adjacent the axially inner surface of end portion 68 of the spring retainer.

The use of the conical spring 74 has the advantage that it provides a more nearly constant pressure throughout the travel of disc 60 and of spring 74 and permits the overall length of the assembly to be made substantially shorter than the length of the assembly of FIGS. 1–3 which uses the helical spring.

It can be seen from the foregoing that there are provided in accordance with this invention a variable pitch pulley construction and method of making such a variable pitch pulley which have many advantages over the prior art. The polygonal contour of the sleeve and of the hub which slides thereon eliminates the fretting problem encountered in the keyed and splined connections of the prior art, and eliminates the necessity of periodically shifting the slidable pulley disc to avoid such fretting. The polygonal contour of the sleeve member and of the slidable hub member also eliminates concentricity and backlash problems encountered in keyed and splined connections of the prior art. The assembly of the hubbed pulley disc in accordance with which the disc and hub are separate elements which are rigidly connected to each other, as by welding, provides an economical construction of the hubbed pulley disc. The production of the polygonal contour sleeve by the steps of extruding a sleeve member substantially to the exact size and shape required and then grinding the external surface of the sleeve to the exact size by a polygon grinding method, provides an economical and efficient method of producing the sleeve member which permits very close tolerances to be maintained. Similarly, the method of producing the hub member for attachment to the disc in accordance with which the hub member is extruded to include a passage therethrough of substantially the shape and size required, and then calibration broaching the interior passage to the exact curvilinear polygonal dimensions required, is also an economical and efficient method of producing the hub member which permits very close tolerances to be maintained. The method of producing the hub and sleeve members provides a highly accurate sliding fit of the relatively slidable members of the pulley construction. The curvilinear polygonal bearing surfaces of the sleeve member and of the sliding hub member provide a greater bearing surface for a given size assembly of pulley and shaft than constructions of the prior art and hence provides a greater torque transmission for a given size pulley and shaft assembly. The use of the Teflon coating on the sleeve member eliminates the necessity for lubricating the relatively slidable surfaces of the pulley.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. In a pulley having a variable effective diameter, a pair of complemental conical thin metallic discs in confronting relation with the smaller ends of the discs disposed radially inwardly; a short hub drivably affixed to the smaller end of one disc; a sleeve having an outer surface of polygonal cross section throughout a major portion of its axial extent, and a bore; means for establishing a driving relation between said sleeve and a shaft received therein; said sleeve being received in said short hub and secured thereto to prevent relative rotation and axial movement between said short hub and sleeve; an elongate hub drivably secured to the other of said discs, and extending outwardly from the smaller end thereof, said elongate hub having an axial passage of polygonal cross section corresponding to that of said outer sleeve surface; said elongate hub snugly and slidably receiving said sleeve in driving relation therewith; and means biasing said discs axially towards one another.

2. The pulley of claim 1 in which the polygonal cross sections of said sleeve and elongate hub define surfaces that are slightly curvilinear.

3. The pulley of claim 1 in which the connection between the short hub and disc is a welded joint.

4. The pulley of claim 1 together with a coating of self-lubricating material between said sleeve and elongate hub and carried by one of the latter.

5. The pulley of claim 1 in which the sleeve carries a coating of polytetrafluoroethylene.

6. The pulley of claim 1 in which the biasing means takes the form of a spring coiled about said elongate hub together with a cover for the spring.

7. In the production of a pulley having a variable effective diameter and including a pair of complemental conical discs, a short hub affixed to one disc, an elongate hub secured to the other disc, and a sleeve received in said hubs, the method comprising the steps of: extruding a member into general hub formation; dividing said member into two parts to provide said short hub and said elongate hub; calibration broaching said hubs to form passages of desired polygonal cross section therein; grinding the external surface of said sleeve to achieve a polygonal contour corresponding to that of the passage in said elongate hub; and assembling said sleeve with said hubs by fixedly securing it to the short hub against axial and rotative movement relative to the sleeve and snugly and slidably fitting the sleeve in the elongate hub.

References Cited

UNITED STATES PATENTS

| | | | |
|---|---|---|---|
| 2,516,829 | 7/1950 | Reeves | 74—230.17 |
| 2,711,103 | 6/1955 | Miner | 74—230.17 |
| 2,937,042 | 5/1960 | Wilder | 74—230.17 |
| 3,010,333 | 11/1961 | Rampe | 74—230.17 |
| 3,114,271 | 12/1963 | Davis | 74—230.17 |
| 3,138,032 | 6/1964 | Raso et al. | 74—230.17 |
| 3,142,997 | 8/1964 | Rampe | 74—230.17 |
| 3,154,959 | 11/1964 | Palm | 74—230.17 |
| 3,273,411 | 9/1966 | Schultz | 74—230.8 |
| 3,318,166 | 5/1967 | Anderson et al. | 74—230.17 |

C. J. HUSAR, *Primary Examiner.*